Figures 1, 2:
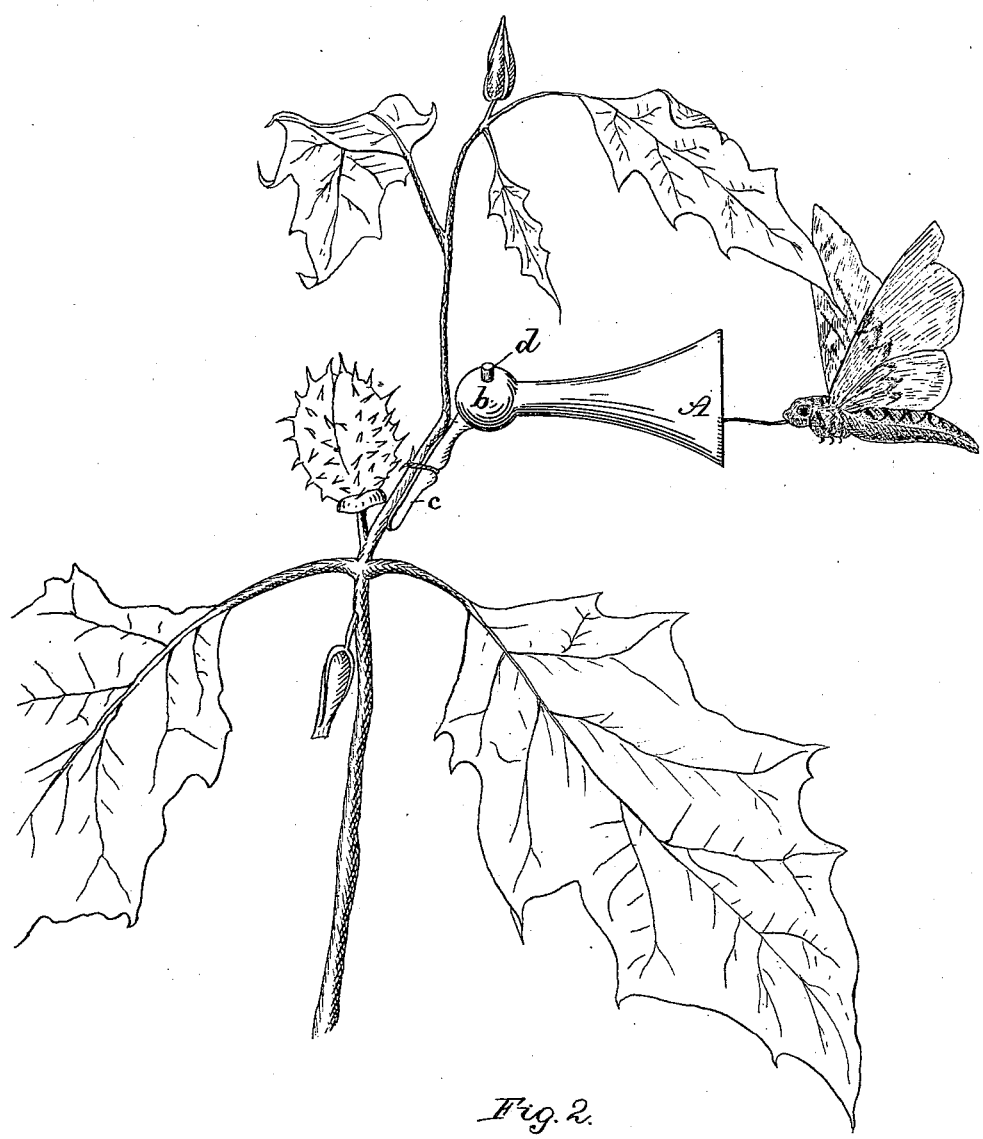

(No Model.)

J. B. HAMILTON.
TOBACCO FLY EXTERMINATOR.

No. 251,222. Patented Dec. 20, 1881.

Witnesses:
J. W. Garner
W. S. D. Haines

Inventor:
Joel B. Hamilton
Howard G. Thorn,
Attorney.

UNITED STATES PATENT OFFICE.

JOEL B. HAMILTON, OF CLAYSVILLE, KENTUCKY.

TOBACCO-FLY EXTERMINATOR.

SPECIFICATION forming part of Letters Patent No. 251,222, dated December 20, 1881.

Application filed October 14, 1881. (No model.)

*To all whom it may concern:*

Be it known that I, JOEL B. HAMILTON, a citizen of the United States of America, residing at Claysville, in the county of Harrison and State of Kentucky, have invented certain new and useful Improvements in Tobacco-Fly Exterminators; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to insecticides; and it consists of an artificial flower, of glass or other suitable material, at the bottom of which is a reservoir and an attachment for attaching the flower to a bush or twig. Said attachment is made hollow, and connects with the reservoir and acts as a supplementary reservoir thereto, as will be hereinafter fully set forth.

In the drawings, Figure 1 is a view of a plant with my artificial flower attached, showing an insect engaged in poisoning itself; and Fig. 2 is a longitudinal section of the artificial flower, showing the reservoir with the mixture in it.

My insecticide is especially adapted to the destruction of the tobacco-fly, and is intended to be attached to the stem of the Jamestown weed like the blossoms of which my artificial flower is modeled. The fly that lays the egg that hatches the tobacco-worm feeds upon the honey in the bottom of the Jamestown-weed flower, and after it has fed flies to the tobacco-plant and lays its egg. By placing the artificial flower upon the weed shortly before the natural flowers blossom, or even while they are in blossom, it will be readily seen that a fly searching for food will be deceived by the artificial flower placed for its convenience, and will plunge its proboscis into the poison contained in the bottom of the flower, which of course will insure the destruction of the fly before it has laid its eggs from which the destructive tobacco-worms are hatched.

The artificial flower A, which may be manufactured from any suitable substance, though I prefer glass or porcelain, has a bell-shaped channel, *a*, which leads into a reservoir, *b*, at its end, and connected with it is the hollow stem *c*, by which the flower is attached to the plant. The hollow stem also acts as an additional reservoir for the poison.

*d* is a plug closing a small hole in the top of the reservoir, through which the flower may be charged.

The application of the flower to the plant is clearly shown in Fig. 1 of the drawings. Any insect poison may be used in my flower.

What I claim is—

An artificial flower consisting of the funnel-shaped portion A, hollow bulb *b*, reservoir *c*, connected with the bulb, and also adapted to afford means by which the flower may be readily attached to a bush or twig, as and for the purposes set forth.

In testimony whereof I affix my signature in presence of two witnesses.

JOEL B. HAMILTON.

Witnesses:
 A. BARLOW,
 J. J. CLIFFORD.